(12) United States Patent
Sagawa et al.

(10) Patent No.: US 7,615,592 B2
(45) Date of Patent: Nov. 10, 2009

(54) PROCESS FOR PRODUCING WATER- AND OIL-REPELLENT AGENT

(75) Inventors: Toshimasa Sagawa, Kitaibaraki (JP); Haruyoshi Tatsu, Kitaibaraki (JP)

(73) Assignee: Unimatec Co., Ltd, Tokyo (JP)

( * ) Notice: Subject to any disclaimer, the term of this patent is extended or adjusted under 35 U.S.C. 154(b) by 251 days.

(21) Appl. No.: 11/628,587

(22) PCT Filed: May 27, 2005

(86) PCT No.: PCT/JP2005/009747

§ 371 (c)(1),
(2), (4) Date: Dec. 4, 2006

(87) PCT Pub. No.: WO2005/118737

PCT Pub. Date: Dec. 15, 2005

(65) Prior Publication Data

US 2008/0071025 A1 Mar. 20, 2008

(30) Foreign Application Priority Data

Jun. 4, 2004 (JP) ............................. 2004-166542

(51) Int. Cl.
*C08L 75/00* (2006.01)
(52) U.S. Cl. ........................ 524/507; 524/544; 524/556; 524/560; 524/805
(58) Field of Classification Search ........................ None
See application file for complete search history.

(56) References Cited

U.S. PATENT DOCUMENTS 6,177,531 B1 * 1/2001 Shimada et al. ............. 526/245
6,376,592 B1 * 4/2002 Shimada et al. ............. 524/457
6,395,821 B1 * 5/2002 Shimada et al. ............. 524/520
6,610,775 B1 * 8/2003 Oharu et al. ................. 524/507
6,624,268 B1 * 9/2003 Maekawa et al. ........... 526/245
2002/0060304 A1 * 5/2002 Ishikawa et al. ........... 252/8.62
2002/0173585 A1 * 11/2002 Funaki et al. ............... 524/544
2003/0130457 A1 * 7/2003 Maekawa et al. ........... 526/242
2004/0087695 A1 * 5/2004 Sugimoto et al. ........... 524/386

FOREIGN PATENT DOCUMENTS

| JP | 2000-144117 A | 5/2000 |
| JP | 2000-160148 A | 6/2000 |
| JP | 2000-212549 A | 8/2000 |
| JP | 2000-248271 A | 9/2000 |
| JP | 2000-282016 A | 10/2000 |
| JP | 2002-256130 A | 9/2002 |
| JP | 2002-275453 A | 9/2002 |
| JP | 2002-356671 A | 12/2002 |
| JP | 2003-13364 A | 1/2003 |
| WO | WO00/58416 | 10/2000 |

* cited by examiner

*Primary Examiner*—David Wu
*Assistant Examiner*—Vu Nguyen
(74) *Attorney, Agent, or Firm*—Butzel Long

(57) ABSTRACT

A water- and oil-repellent agent is produced by subjecting (a) a polyfluoroalkyl group-containing (meth)acrylate and (b) a fluorine atom-free polymerizable monomer to an emulsification treatment in the presence of (c) a polyethylene oxide adduct type, cationic surfactant, or both of the cationic surfactant and a polyethylene oxide adduct type, non-ionic surfactant, and (d) a glycol-based compound, followed by copolymerization reaction in the presence of a polymerization initiator, and admixing the resulting aqueous dispersion with (e) a blocked isocyanate, and gives a satisfactory water and oil repellency to not only synthetic fibers, but also natural fibers, and also has a distinguished washing durability.

11 Claims, No Drawings

PROCESS FOR PRODUCING WATER- AND OIL-REPELLENT AGENT

RELATED APPLICATION

The present application is a 35 U.S.C. §371 national stage filing of International Patent Application No. PCT/JP2005/009747, filed May 27, 2005, through which and to which priority is claimed to Japanese Priority Patent Application No. 2004-166542, filed Jun. 4, 2004.

TECHNICAL FIELD

The present invention relates to a process for producing a water- and oil-repellent agent, and more particularly to a process for producing a water- and oil-repellent agent having a distinguished washing durability.

BACKGROUND ART

The water- and oil-repellency can be now given to fibers by use of a water- and oil-repellent agent comprising a polyfluoroalkyl group-containing (meth)acrylate copolymer as an effective component. Patent Literature 1 discloses water dispersion type, water- and oil-repellent agents effective for giving fibers both durabilities of water and oil repellency and water pressure resistance, against repeated washings. The water dispersion type, water- and oil-repellent agent comprises a mixture of an emulsion polymerization product prepared from a mixture of mixed perfluoroalkyl acrylates having perfluoroalkyl groups of 6-16 carbon atoms, a polymerizable monomer such as dioctyl maleate, 2-hydroxyethyl acrylate, N,N-dimethyl acrylamide, etc., a surfactant, and a solvent, with a blocked isocyanate emulsion, but fails to give a satisfactory water and oil repellency to not only the synthetic fibers, but also the natural fibers.

Patent Literature 1: WO 00/58416

DISCLOSURE OF THE INVENTION

Problem to be Solved by the Invention

An object of the present invention is to provide a process for producing a water- and oil-repellent agent capable of giving a satisfactory water- and oil-repellency to not only synthetic fibers, but also the natural fibers, and also having a distinguished washing durability.

Means for Solving the Problem

The object of the present invention can be attained by a process for producing a water- and oil-repellent agent, which comprises subjecting (a) a polyfluoroalkyl group-containing (meth)acrylate, and (b) a fluorine atom-free, polymerizable monomer to an emulsification treatment in the presence of (c) a polyethylene oxide adduct type, cationic surfactant, or both of the cationic surfactant and a polyethylene oxide adduct type, non-ionic surfactant, and (d) a glycol-based compound, followed by copolymerization reaction in the presence of a polymerization initiator, and admixing the resulting aqueous dispersion with (e) a blocked isocyanate.

EFFECT OF THE INVENTION

The water- and oil-repellent agent produced according to the present process has an improved washing durability by further adding a blocked isocyanate to the aqueous dispersion which is capable of giving a satisfactory water and oil repellency to not only the synthetic fibers, but also the natural fibers.

BEST MODES FOR CARRYING OUT THE INVENTION (a) a polyfluoroalkyl group-containing (meth)acrylate, represented by the following general formula:

$$CH_2=CRCOOR_1(NR_2SO_2)_mRf$$

R: a hydrogen atom or a methyl group
$R_1$: a divalent organic group having 1-12 carbon atoms
$R_2$: an alkyl group having 1-12 carbon atoms
Rf: a polyfluoroalkyl group having 4-20 carbon atoms
m: 0, or 1 can be used, and includes the following polyfluoroalkyl group-containing (meth)acrylate compounds, for example, $CH_2=CHCOOCH_2C_nF_{2n}H$
$CH_2=C(CH_3)COOCH_2C_nF_{2n}H$
$CH_2=CHCOOCH_2C_nF_{2n+1}$
$CH_2=C(CH_3)COOCH_2C_nF_{2n+1}$
$CH_2=CHCOOC_2H_4C_nF_{2n+1}$
$CH_2=C(CH_3)COOC_2H_4C_nF_{2n+1}$
$CH_2=CHCOOC_3H_6C_nF_{2n+1}$
$CH_2=C(CH_3)COOC_3H_6C_nF_{2n+1}$
$CH_2=CHCOOC_4H_8C_nF_{2n+1}$
$CH_2=C(CH_3)COOC_4H_8C_nF_{2n+1}$
$CH_2=CHCOOC_2H_4N(CH_3)SO_2C_nF_{2n+1}$
$CH_2=C(CH_3)COOC_2H_4N(CH_3)SO_2C_nF_{2n+1}$
$CH_2=CHCOOC_2H_4N(C_2H_5)SO_2C_nF_{2n+1}$
$CH_2=C(CH_3)COOC_2H_4N(C_2H_5)SO_2C_nF_{2n+1}$
$CH_2=CHCOOC_2H_4N(C_3H_7)SO_2C_nF_{2n+1}$
$CH_2=C(CH_3)COOC_2H_4N(C_3H_7)SO_2C_nF_{2n+1}$
$CH_2=CHCOOC_2H_4C_nF_{2n}CF(CF_3)_2$
$CH_2=C(CH_3)COOC_2H_4C_nF_{2n}CF(CF_3)_2$ The perfluoroalkyl group in the perfluoroalkyl group-containing (meth)acrylates can be a mixture of $C_nF_{2n+1}$ groups having various n values (generally n=6-10). Even if (meth)acrylate copolymers containing a mixture of perfluoroalkyl groups including perfluoroalkyl groups having 12 or more carbon atoms, or, if any, 16 or more carbon atoms, are used, the present invention can provide an aqueous dispersion with a good emulsion stability. The perfluoroalkyl group-containing (meth)acrylate is subjected to copolymerization in a proportion of 10% by weight, or more, preferably 25-75% by weight, on the basis of the copolymer as used in the preparation of the aqueous dispersion, thereby attaining a distinguished water and oil repellency.

(b) a fluorine atom-free polymerizable monomer to be copolymerized with (a) a polyfluoroalkyl group-containing (meth)acrylate includes, for example, acrylic acid esters or methacrylic acid esters, as esterified with an alkyl group such as methyl, ethyl, propyl, isopropyl, n-butyl, n-hexyl, 2-ethylhexyl, n-octyl, lauryl, stearyl, etc., a cycloalkyl group such as cyclohexyl, etc., an aralkyl group such as benzyl, etc., and an alkoxyalkyl group such as methoxymethyl, 2-methoxyethyl, 2-ethoxyethyl, 2-butoxyethyl, 3-ethoxypropyl, etc., dialkyl esters such as dimethyl, diethyl, dipropyl, dibutyl, dioctyl, etc. of fumaric acid or maleic acid and vinyl esters such as vinyl acetate, vinyl caprylate, etc. Preferably combinations of alkyl (meth)acrylate having a long alkyl group chain having 8 or more carbon atoms, specifically, acrylic acid esters, as esterified with an alkyl group such as 2-ethylhexyl, n-octyl, lauryl, stearyl, etc., a cycloalkyl group such as cyclohexyl, etc., an aralkyl group such as benzyl, etc., and more preferably combinations of an acryl acid ester, as esterified with an alkyl group such as 2-ethylhexyl, stearyl, etc., with a (meth) acrylic acid ester, a esterified with an aralkyl group such as benzyl, etc. are preferably used from the viewpoint between the water repellency and the oil repellency. The fluorine atom-free polymerizable monomer can be used in a proportion of 90% by weight or less, preferably 75-25% by weight, on the basis of the copolymer as used in the preparation of the aqueous dispersion.

In the present invention, a terpolymer of perfluoroalkylethyl acrylate-2-ethylhexyl methacrylate-benzyl methacrylate can be particularly preferably used. The terpolymer composition is in a range of about 15 to about 85% by weight, preferably about 25 to about 75% by weight, of perfluoroalkylethyl acrylate, about 5 to about 65% by weight, preferably about 10 to about 45% by weight, of 2-ethylhexyl methacrylate, and about 1 to about 40% by weight, preferably about 5 to about 30% by weight, of benzyl methacrylate.

The copolymer can be further copolymerized with another copolymerizable monomer in such a range as not to deteriorate the characteristics, for example, in a proportion of 30% by weight, or less on the basis of the resulting copolymer. Such a copolymerizable monomer includes, for example, such other vinyl compounds than the (meth)acrylic acid esters, diesters of fumaric acid or maleic acid, and vinyl esters, as mentioned as the foregoing component (b), such as styrene, vinyltoluene, α-methylstyrene, vinylnaphthalene, acrylonitrile, methacrylonitrile, acetoneacrylamide, 2-hydroxyethyl acrylate, 4-hydroxybutyl acrylate, 2-hydroxy-3-chloropropyl(meth)acrylate, polyethylene glycol mono (meth)acrylate, polypropylene glycol mono(meth)acrylate, vinyl fluoride, vinylidene fluoride, hydroxyethyl vinyl ether, hydroxybutyl vinyl ether, etc., and diene compounds such as isoprene, pentadiene, butadiene, etc.

If required, a polyfunctional monomer or oligomer can be copolymerized in a proportion of 30% by weight, or less on the basis of the resulting copolymer. Such a polyfunctional monomer or oligomer includes, for example, ethylene glycol di(meth)acrylate, propylene glycol di(meth)acrylate, 1,4-butanediol di(meth)acrylate, 1,6-hexanediol di(meth)acrylate, 1,9-nonanediol di(meth)acrylate, neopentyl glycol di(meth) acrylate, tetraethylene glycol di(meth)acrylate, tripropylene glycol di(meth)acrylate, polypropylene glycol di(meth)acrylate, bisphenol A•ethylene oxide adduct diacrylate, dimethylol tricyclodecane diacrylate, glycerin methacrylate acrylate, 3-acryloyl oxyglycerin monomethacrylate, etc.

All of these individual polymerizable monomers are subjected to copolymerization in the presence of a surfactant emulsifier of a polyethylene oxide-based cationic surfactant or both of the cationic surfactant and a non-ionic surfactant, and an emulsification aid of glycol-based compound.

For the surfactant acting as an emulsifier, a polyethylene oxide adduct type, cationic surfactant, or both of the cationic surfactant and a polyethylene oxide adduct type, non-ionic surfactant can be used in a proportion of 1-20% by weight, preferably 1-10% by weight, on the basis of total weight of the copolymer. The polyethylene oxide-based cationic surfactant includes quaternary ammonium salt-based surfactants, for example, alkyl ammonium chlorides or alkyl pyridinium salts, having 1-3 polyoxyethylene groups such as higher alkyl (12-18 carbon atoms) dimethyl ammonium chlorides, higher alkyl methylammonium chlorides, dodecyl benzyl dimethyl ammonium acetate, etc., all of which are polyethylene oxide adducts. In that case, a cationic surfactant without any polyethylene oxide adduct, such as stearyl trimethyl ammonium chloride, dodecyl trimethyl ammonium acetate, dodecyl trimethyl ammonium chloride, trimethyl ammonium tetradecyl chloride, trimethyl ammonium hexadecyl chloride, and trimethyl ammonium octadecyl chloride can be used simultaneously in a proportion of preferably about 0.1 to about 2 parts by weight on the basis of one part by weight of the polyethylene oxide adduct type, cationic surfactant.

The polyethylene oxide-based non-ionic surfactant to be used together with the cationic surfactant includes reaction products of polyethylene oxide with an alkyl ether, an alcohol such as hexyl phenol, octyl phenol, nonyl phenol, polycyclic phenyl ether, dodecanol, hexadecanol, octadecanol, oleyl alcohol, etc., oleic acid, an alkylamine of $C_{12}$-$C_{18}$, sorbitan monofatty acid, etc. Preferably, a reaction product of polyethylene oxide with an alcohol such as octyl phenol, nonyl phenol, dodecanol, or hexadecanol, can be used in a proportion of 80% by weight, or less, preferably about 30 to about 80% by weight, on the basis of total weight of the polyethylene oxide adduct type surfactants.

In place of the cationic surfactants, an amine compound having a polyethylene oxide chain, as neutralized with an organic acid such as acetic acid, etc. can be also used. Such an amine compound for use herein includes polyoxyethylene octadecylamine (e.g. Amete 320, a Kao product), polyoxyethylene alkyldiamine, represented by the following formula:

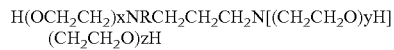

(e.g. Esoduomin T/25, a Lion product), polyoxyethylene dodecylamine (e.g. Nymin L-207, a NOF product), etc.

The glycol-based compound to be used as an emulsification aid in combination with the emulsifiers includes, for example, ethylene glycol, diethylene glycol, diethylene glycol monomethyl ether, triethylene glycol, tetraethylene glycol, propylene glycol, dipropylene glycol, tripropylene glycol, tetrapropylene glycol, dipropylene glycol monomethyl ether, tripropylene glycol monomethyl ether, hexylene glycol, polypropylene glycol, or its terminal monomethyl ether, propylene glycol adduct of glycerin, etc. Preferably, a polypropylene glycol-based compound having a molecular weight of 300-3,000, or hexylene glycol can be used in a proportion of 10-100% by weight, preferably 15-70% by weight, on the basis of the total weight of comonomers.

Prior to the copolymerization reaction, a polymerizable monomer mixture containing a polyfluoroalkyl group-containing (meth)acrylate and a fluorine-free polymerizable monomer is subjected to an emulsification treatment in the presence of a surfactant emulsifier and an emulsification aid of glycol-based compound. The emulsification treatment can be thoroughly carried out by a high pressure homogenizer, etc.

Copolymerization reaction of emulsification-treated polymerizable monomers is carried out in the presence of a radical polymerization initiator as added thereto. For the radical polymerization initiator, any of an organic peroxide, an azo compound, a persulfate salt, etc. can be used, and preferably a water-soluble radical polymerization initiator such as potassium persulfate, ammonium persulfate, 2,2'-azobis(2-amidinopropane)•dihydrochloride, etc. can be used. The reaction is carried out in an aqueous medium at about 40° to about 80° C. for about 1 to about 10 hours to form an undiluted aqueous dispersion (aqueous emulsion) having a solid matter concentration of about 15 to about 35% by weight.

At the time of copolymerization reaction, a cross-linkable group-containing monomer, such as (meth)acrylamide, N-methylol (meth(acrylamide, N-methoxymethyl acrylamide, N-butoxymethyl acrylamide, glycidyl (meth)acrylamide, etc. can be added together with the radical polymerization initiator, and copolymerized in a proportion of about 10% by weight, or less, preferably about 0.5 to about 7% by weight, on the basis of the resulting copolymer. The further copolymerization of the cross-linkable group-containing monomer can enhance the durability of a water and oil repellent due to cross-linking with hydroxyl groups on the fiber surfaces or due to self-cross-linking.

A blocked isocyanate is added to the resulting aqueous dispersion (aqueous emulsion) in a proportion of 0.15-3.0 parts by weight, preferably 0.3-2.0 parts by weight on the basis of one part by weight of the weight of the solid matters in the aqueous dispersion. The blocked isocyanate can give a distinguished water repellency and a high washing durability also to natural fibers such as cotton, etc. When the blocked isocyanate is used in a proportion of less than 0.15 parts by weight, the washing durability will be lowered, whereas in a proportion of more than 3.0 parts by weight, feeling of clothes will be deteriorated.

The term blocked isocyanate herein used means a compound having at least one blocked isocyanate group and no polymerizable carbon-carbon unsaturated bond, i.e. a compound in such a structure that the isocyanate group is blocked by a blocking agent. Such a blocked isocyanate is preferably a compound prepared by reaction of a polyisocyanate with a compound having at least two active hydrogen atoms in the molecule, the resulting compound being in such a structure that its isocyanate group is blocked by the blocking agent.

The polyisocyanate includes, for example, an aromatic isocyanate such as 4,4'-diphenylmethane diisocyanate, 2,4'-diphenylmethane diisocyanate, tolylene diisocyanate, etc., an aliphatic isocyanate such as trimethylene diisocyanate, tetramethylene diisocyanate, pentamethylene diisocyanate, hexamethylene diisocyanate, 1,2-propane diisocyanate, 1,2-butane diisocyanate, trimethylhexamethylene diisocyanate, isophorone diisocyanate, 4,4'-dicyclohexylmethane diisocyanate, cyclohexylene diisocyanate, etc., and their isocyanurate modified compounds, prepolymer modified compounds, biuret modified compounds, allophanate modified compounds, etc.

The compound having at least two active hydrogen atoms in the molecule is preferably a polyhydric alcohol or a polyvalent amine. The polyhydric alcohol includes, for example, at least one of ethylene glycol, propylene glycol, butanediols, pentanediols, hexanediols, glycerin, trimethylolpropane, pentaerythritol, sorbitol, neopentyl glycol, bisphenol A, xylylene glycol, etc., or their modified alcohols. The polyvalent amine includes, for example, hexamethylenediamine, 3,3'-iminobispropylamine, etc. The polyhydric alcohol may be polyester polyol. The polyester polyol for use herein includes those having an ester bond, obtained by reaction of a polyhydric alcohol with a polyvalent carboxylic acid such as phthalic acid, adipic acid, fumaric acid, pyromellitic acid, trimellitic acid, an aliphatic dicarboxylic acid, etc., or their derivatives.

The blocking agent for the isocyanate includes, for example, alkylketone oximes, phenols, alcohols, β-diketones, and lactams, preferably methyl ethyl ketone oxime, ε-caprolactam, phenol, cresol, acetylacetone, diethyl malonate, isopropyl alcohol, t-butyl alcohol, maleic acid imide, etc., more preferably compounds having a dissociation temperature of 120°-180° C., typically dialkyl ketone oximes such as methyl ethyl ketone oxime, etc., lactams such as ε-caprolactam, etc.

The blocked isocyanate can be prepared by reaction of an isocyanate compound with a polyhydric alcohol, followed by reaction with a blocking agent, as mentioned above, and it is preferable to conduct these reactions in a non-aqueous solvent such as ketones, ethers, hydrocarbons, etc. It is further preferable that the equivalent weights each of the isocyanate compound, the compound having at least two active hydrogen atoms in the molecule, and the blocking agent become equal to one another when all the reactions are complete.

After the blocking reaction, it is preferable that the blocked isocyanate is emulsified with water and a non-ionic emulsifier, a non-ionic/cationic emulsifier, or a non-ionic/anionic emulsifier, particularly a non-ionic/cationic emulsifier. The solvent is removed from the reaction system, if required, after the emulsification.

The blocked isocyanate is commercially available. For example, Ruco Guard XTS, a Rudolf product; Ruco Guard WEB, a Rudolf product; NK Assist-NY, a Nikka Chemical product; NK Assist-V, a Nikka Chemical product; NK Assist-FU, a Nikka Chemical product; Prominate XC-830, a Gantsu Chemical product; Prominate XC-915, a Gantsu Chemical product; Prominate XC-950, a Gantsu Chemical product Elastron BN-69, a Daichi Kogyo Seiyaku product; etc. can be used as such.

The aqueous dispersion can further contain other additives such as other cross-linking agents than the blocked isocyanate, e.g. melamine resin, urea resin, etc., a polymer extender, other water repellents such as silicone resin or oil, wax, etc., and also other necessary additives for the water- and oil-repellent agent use, e.g. an insecticide, an antistatic agent, a dye stabilizer, an anticreasing agent, a stain blocker, etc.

The aqueous dispersion admixed with the blocked isocyanate so prepared can be effectively applied as a water- and oil-repellent agent to paper, films, fibers, clothes, woven fabrics, carpets, or fabric products made from filaments, fibers, threads, etc. Ordinary application procedure includes coating, dipping, spraying, padding, roll coating or combinations thereof. For example, a bath having a solid matter concentration of about 0.1 to about 10% by weight can be provided for use as a pad bath. A material to be treated is padded with the pad bath, and the excess dispersion in the material is removed therefrom by squeeze rolls, followed by drying to retain about 0.01 to about 10% by weight of the copolymer in the material then, the material is dried generally at about 100° to about 200° C. for about one minute to about 2 hours, depending on the species of the material, thereby completing the water and oil repellent treatment.

The present invention will be described in detail below, referring to Examples.

EXAMPLES

Reference Example 1

|  | Parts by weight |
|---|---|
| Perfluoroalkyl ethyl acrylate (mixture of n = 6:6%, 8:52%, 10:24%, 12:7% and 14:2%, in total of 91%, with 8.8 carbon atoms on average) | 133.5 |
| 2-Ethylhexyl methacrylate | 99.5 |
| Benzyl methacrylate | 49.0 |
| Lauryl mercaptan | 0.9 |
| Polypropylene glycol (Uniol D-400, a NOF product; molecular weight: 400) | 57.0 |
| Polyoxyethylene (n: 15) alkyl ammonium chloride (Esoguard C/25, a Lion product) | 18.0 |
| Ion-exchanzed water | 400.7 |

All the foregoing components were placed into a reactor, and subjected to an emulsification treatment at 60 MPa with a high pressure homogenizer, and the resulting emulsion was flushed with a nitrogen gas. Then, the reactor temperature was slowly increased to 40° C., and successively a solution containing 11.8 parts by weight of N-methylol acrylamide in 100 parts by weight of ionized water and a solution containing 5.9 parts by weight of 2,2'-azobis(2-amidinopropane)•dihydrochloride in 100 parts by weight of ionized water were charged thereto, followed by slowly increasing the inside temperature to 70° C. to conduct reaction for 4 hours. After the completion of the reaction, 961 parts by weight of an aqueous dispersion having a solid matter concentration of 30% by weight was obtained by cooling.

Reference Example 2

In Reference Example 1, the amount of polyoxyethylene (n:15) alkyl ammonium chloride as a surfactant was changed to 12 parts by weight, and 12 parts by weight of polyoxyethylene (n:20) alkyl ether (Nonion S-220, a NOF product) was further used.

Reference Example 3

In Reference Example 1, in place of polyoxyethylene (n:15) alkyl ammonium chloride as a surfactant, 11 parts by weight of polyoxyethylene (n:20) alkyl ether (Nonion S-220), 8 parts by weight of stearyl trimethyl ammonium chloride (Coatamine 86P Conc., a Kao product), and 15 parts by weight of acid-neutralized polyoxyethylene (n:20) alkylamine (Ameat 320) were used.

Reference Example 4

In Reference Example 1, the amount of polyoxyethylene (n:15) alkyl ammonium chloride as a surfactant was changed to 16 parts by weight, and 11 parts by weight of polyoxyethylene (n:20) alkyl ether (Nonion S-220) and 15 parts by weight of acid-neutralized polyoxyethylene (n:20) alkylamine (Ameat 320) were further used.

Reference Example 5

In Reference Example 1, in place of polyoxyethylene (n:15) alkyl ammonium chloride as a surfactant, 18 parts by weight of acid-neutralized polyoxyethylene (n:15) alkyldiamine (Esoduomine T/25) was used.

Reference Example 6

In Example 1, in place of polypropylene glycol, 57 parts by weight of hexylene glycol (HEG, a Godo Solvent product) was used.

Comparative Example 1

In Reference Example 1, the amounts of 2-ethylhexyl methacrylate and benzyl methacrylate were changed to 124 parts by weight and 24.5 parts by weight, respectively, and in place of polyoxyethylene (n:15) alkyl ammonium chloride as a surfactant, the same amount of stearyl trimethyl ammonium chloride (Coatamin 86P Conc.) was used.

Comparative Example 2

In Reference Example 1, in place of polyoxyethylene (n:15) alkyl ammonium chloride as a surfactant, the same amount of stearyl trimethyl ammonium chloride (Coatamin 86P Conc.) was used.

Comparative Example 3

In Reference Example 1, in place of polyoxyethylene (n:15) alkyl ammonium chloride as a surfactant, 11 parts by weight of stearyl trimethyl ammonium chloride (Coatamin 86P Conc.), 16 parts by weight of distearyl dimethyl ammonium chloride (Coatamin D86P, a Kao product), and 11 parts by weight of polyoxyethylene (n:20) octyl phenyl ether (Nonion HS-220, a NOF product) were used.

Comparative Example 4

In Reference Example 1, in place of polyoxyethylene (n:15) alkyl ammonium chloride as a surfactant, 11 parts by weight of stearyl trimethyl ammonium chloride (Coatamin 86P Conc.), 16 parts by weight of distearyl dimethyl ammonium chloride (Coatamin D86P), and 11 parts by weight of polyoxyethylene (n:20) octyl phenyl ether (Nonion HS-220) were used.

Comparative Example 5

In Reference Example 1, in place of 2-ethylhexyl methacrylate, the same amount of lauryl methacrylate was used. In place of polyoxyethylene (n:15) alkyl ammonium chloride, the same amount of stearyl trimethyl ammonium chloride (Coatamin 86P Conc.) was used.

The aqueous dispersions obtained in the foregoing Reference Examples and Comparative Examples were diluted with ion-exchanged water each to a solid matter concentration of 0.9% by weight, and cotton cloth, cotton/polyester mixed spun cloth, polyester cloth, and polyamide cloth were dipped into the resulting individual diluted aqueous dispersions to determine water repellency (according to JIS L1092) and oil repellency (according to AATCC-TM118-1966), where after-squeezing wet pickup values were found 100% for the cotton cloth, 65% for the cotton/polyester mixed spun cloth, 60% for the polyester cloth, and 40% for the polyamide cloth. Drying and curing conditions were 165° C. for 3 minutes for the cotton cloth and the cotton/polyester cloth, and 185° C. for 1.5 minutes for the polyester cloth and the polyamide cloth, each by a pin tenter baking machine.

The results are shown in the following Table 1.

TABLE 1

|  | Reference Example No. | | | | | | Comp. Ex. No. | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| [water repellency] | | | | | | | | | | | |
| Cotton cloth | 100 | 100 | 90 | 100 | 100 | 100 | 70 | 70 | 80 | 80 | 80 |
| Cotton/polyester mixed spun cloth | 100 | 100 | 100 | 100 | 100 | 100 | 100 | 100 | 100 | 100 | 100 |

TABLE 1-continued

|  | Reference Example No. | | | | | | Comp. Ex. No. | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| Polyester cloth | 100 | 100 | 100 | 100 | 100 | 100 | 100 | 100 | 100 | 100 | 100 |
| Polyamide cloth | 100 | 100 | 100 | 100 | 100 | 100 | 100 | 100 | 100 | 100 | 100 |
| [Oil repellency] | | | | | | | | | | | |
| Cotton cloth | 6 | 6 | 5 | 6 | 6 | 6 | 5 | 5 | 5 | 5 | 5 |
| Cotton/polyester mixed spun cloth | 6 | 5 | 7 | 8 | 8 | 6 | 6 | 6 | 6 | 6 | 6 |
| Polyester cloth | 5 | 6 | 6 | 6 | 7 | 7 | 5 | 6 | 7 | 6 | 6 |
| Polyamide cloth | 6 | 8 | 8 | 8 | 8 | 6 | 7 | 7 | 8 | 7 | 7 |

These treated clothes were subjected to 5 runs of washing durability tests and it was found that the water repellency of cotton clothes was lowered to 50-70 in all the Reference Examples and Comparative Examples, and the initial water repellency could not be maintained.

Washing durability test: one kg each of washing clothes was washed with 30 L of warm water at 40° C. and 21 g of a detergent (Attack, a Kao product) under the following conditions: washing for 12 minutes—dewatering for 3 minutes—rinsing in running water for 6 minutes—dewatering for 5 minutes—tumbler drying.

Example 1

2.3 parts by weight (corresponding to 0.69 parts by weight of solid matters) of the aqueous dispersion (solid matter content adjusted to 30%) obtained in Reference Example 1 was admixed with 0.7 parts by weight of a blocked isocyanate emulsion of diphenylmethane diisocyanate, etc. (Ruco Guard XTS), and diluted with 97 parts by weight of ion-exchanged water to obtain a water- and oil-repellent agent.

Example 2

In Example 1, in place of Ruco Guard XTS, the same amount of NK Assist V, a Nikka Chemical product, was used as a blocked isocyanate of diphenylmethane diisocyanate, etc.

Example 3

In Example 1, in place of Ruco Guard XTS, 0.5 parts by weight of a blocked isocyanate emulsion of tolylene diisocyanate, etc. (Prominate XC-915) was used as a blocked isocyanate emulsion, and the amount of ionexchanged water was changed to 97.2 parts by weight.

Example 4

In Example 1, in place of the aqueous dispersion obtained in Reference Example 1, the same amount of the aqueous dispersion obtained in Reference Example 2 was used.

Example 5

In Example 1, in place of the aqueous dispersion obtained in Reference Example 1, the same amount of the aqueous dispersion obtained in Reference Example 3 was used.

Example 6

In Example 1, in place of the aqueous dispersion obtained in Reference Example 1, the same amount of the aqueous dispersion obtained in Reference Example 6 was used.

Comparative Example 6

In Example 1, in place of the aqueous dispersion obtained in Reference Example 1, the same amount of the aqueous dispersion obtained in Comparative Example 1 was used.

Comparative Example 7

In Example 1, in place of the aqueous dispersion obtained in Reference Example 1, the same amount of the aqueous dispersion obtained in Comparative Example 2 was used.

Comparative Example 8

In Example 1, in place of the aqueous dispersion obtained in Reference Example 1, the same amount of the aqueous dispersion obtained in Comparative Example 3 was used.

Comparative Example 9

In Example 1, in place of the aqueous dispersion obtained in Reference Example 1, the same amount of the aqueous dispersion obtained in Comparative Example 4 was used.

Comparative Example 10

In Example 1, in place of the aqueous dispersion obtained in Reference Example 1, the same amount of the aqueous dispersion obtained in Comparative Example 5 was used.

The water- and oil-repellents agents obtained in the foregoing Examples 1 to 6, and Comparative Examples 6 to 10 (which will be hereinafter referred to as "undiluted dispersions of water- and oil-repellent agent", aqueous dispersions obtained by diluting the undiluted aqueous dispersions to two-fold with ion-exchanged water (as will be hereinafter referred to as "2-fold diluted dispersions of water- and oil-repellent agent"), and aqueous dispersions likewise diluted to four-fold (as will be hereinafter referred to as "4-fold diluted dispersions of water- and oil-repellent agent") were used for dipping cotton cloth, cotton/polyester mixed spun cloth, polyester cloth, and polyamide cloth to determine the water repellency and the oil repellency in the same manner as in Reference Example 1. The results are shown in Table 2 for the undiluted dispersions of the water- and oil-repellent agents, in Table 3 for the 2-fold diluted dispersions of the water- and oil-repellent agents, and in Table 4 for the 4-fold diluted dispersions of the water- and oil-repellent agents.

TABLE 2

(Undiluted dispersions of water- and oil-repellent agent)

| | Example No. | | | | | | Comp. Ex. No. | | | | |
|---|---|---|---|---|---|---|---|---|---|---|---|
| | 1 | 2 | 3 | 4 | 5 | 6 | 6 | 7 | 8 | 9 | 10 |
| [water repellency] | | | | | | | | | | | |
| Cotton cloth | 100 | 100 | 100 | 100 | 100 | 100 | 80 | 80 | 80 | 80 | 80 |
| Cotton/polyester mixed spun cloth | 100 | 100 | 100 | 100 | 100 | 100 | 100 | 100 | 100 | 100 | 100 |
| Polyester cloth | 100 | 100 | 100 | 100 | 100 | 100 | 100 | 100 | 100 | 100 | 100 |
| Polyamide cloth | 100 | 100 | 100 | 100 | 100 | 100 | 100 | 100 | 100 | 100 | 100 |
| [Oil repellency] | | | | | | | | | | | |
| Cotton cloth | 6 | 6 | 6 | 6 | 6 | 6 | 5 | 5 | 5 | 5 | 5 |
| Cotton/polyester mixed spun cloth | 7 | 6 | 7 | 7 | 7 | 7 | 7 | 6 | 6 | 6 | 5 |
| Polyester cloth | 6 | 7 | 6 | 7 | 6 | 6 | 6 | 6 | 6 | 6 | 6 |
| Polyamide cloth | 8 | 8 | 8 | 8 | 7 | 8 | 8 | 7 | 8 | 7 | 7 |

TABLE 3

(Two-fold diluted dispersions of water- and oil-repellent agent)

| | Example No. | | | | | | Comp. Ex. No. | | | | |
|---|---|---|---|---|---|---|---|---|---|---|---|
| | 1 | 2 | 3 | 4 | 5 | 6 | 6 | 7 | 8 | 9 | 10 |
| [water repellency] | | | | | | | | | | | |
| Cotton cloth | 100 | 100 | 90 | 100 | 100 | 100 | 80 | 80 | 80 | 80 | 80 |
| Cotton/polyester mixed spun cloth | 100 | 100 | 100 | 100 | 100 | 100 | 90 | 80 | 90 | 90 | 90 |
| Polyester cloth | 100 | 100 | 100 | 100 | 100 | 100 | 100 | 100 | 100 | 100 | 100 |
| Polyamide cloth | 100 | 100 | 100 | 100 | 100 | 100 | 100 | 90 | 100 | 90 | 100 |
| [Oil repellency] | | | | | | | | | | | |
| Cotton cloth | 4 | 4 | 4 | 4 | 4 | 4 | 3 | 3 | 4 | 4 | 3 |
| Cotton/polyester mixed spun cloth | 5 | 6 | 6 | 6 | 7 | 5 | 7 | 6 | 6 | 6 | 5 |
| Polyester cloth | 5 | 5 | 5 | 6 | 6 | 5 | 6 | 6 | 6 | 6 | 6 |
| Polyamide cloth | 6 | 7 | 7 | 7 | 7 | 6 | 8 | 7 | 8 | 7 | 7 |

TABLE 4

(Four-fold diluted dispersions of water- and oil-repellent agent)

| | Example No. | | | | | | Comp. Ex. No. | | | | |
|---|---|---|---|---|---|---|---|---|---|---|---|
| | 1 | 2 | 3 | 4 | 5 | 6 | 6 | 7 | 8 | 9 | 10 |
| [water repellency] | | | | | | | | | | | |
| Cotton cloth | 80 | 80 | 80 | 80 | 80 | 80 | 70 | 70 | 70 | 70 | 70 |
| Cotton/polyester mixed spun cloth | 100 | 90 | 90 | 100 | 100 | 90 | 80 | 80 | 80 | 90 | 80 |
| Polyester cloth | 100 | 100 | 100 | 100 | 100 | 100 | 100 | 100 | 100 | 100 | 100 |
| Polyamide cloth | 100 | 100 | 100 | 100 | 100 | 100 | 100 | 90 | 90 | 100 | 90 |
| [Oil repellency] | | | | | | | | | | | |
| Cotton cloth | 2 | 2 | 1 | 2 | 2 | 2 | 1 | 1 | 0 | 1 | 0 |
| Cotton/polyester mixed spun cloth | 4 | 4 | 4 | 4 | 4 | 3 | 4 | 3 | 3 | 4 | 3 |
| Polyester cloth | 5 | 5 | 5 | 5 | 5 | 4 | 5 | 4 | 4 | 4 | 5 |
| Polyamide cloth | 5 | 5 | 5 | 5 | 5 | 5 | 5 | 5 | 4 | 5 | 5 |

The clothes treated with undiluted dispersions of water- and oil-repellent agents obtained in Example 1 to 6 and Comparative Examples 6 to 10 were subjected to 5 runs of washing durability tests, and the results are shown in the following Table 5.

TABLE 5

|  | Example No. | | | | | | Comp. Ex. No. | | | | |
| --- | --- | --- | --- | --- | --- | --- | --- | --- | --- | --- | --- |
|  | 1 | 2 | 3 | 4 | 5 | 6 | 6 | 7 | 8 | 9 | 10 |
| [water repellency] | | | | | | | | | | | |
| Cotton cloth | 100 | 100 | 100 | 100 | 100 | 100 | 70 | 70 | 80 | 80 | 80 |
| Cotton/polyester mixed spun cloth | 100 | 100 | 100 | 100 | 100 | 100 | 100 | 100 | 100 | 100 | 100 |
| Polyester cloth | 100 | 100 | 100 | 100 | 100 | 100 | 100 | 100 | 100 | 100 | 100 |
| Polyamide cloth | 100 | 100 | 100 | 100 | 100 | 100 | 100 | 100 | 100 | 100 | 100 |
| [Oil repellency] | | | | | | | | | | | |
| Cotton cloth | 5 | 5 | 5 | 5 | 5 | 5 | 5 | 4 | 5 | 4 | 2 |
| Cotton/polyester mixed spun cloth | 7 | 6 | 7 | 6 | 7 | 6 | 5 | 5 | 5 | 5 | 4 |
| Polyester cloth | 5 | 5 | 5 | 6 | 6 | 5 | 5 | 5 | 5 | 5 | 5 |
| Polyamide cloth | 7 | 7 | 7 | 7 | 7 | 6 | 6 | 7 | 6 | 7 | 6 |

The invention claimed is:

1. A process for producing a water- and oil-repellent agent, which process comprises subjecting (a) 15-85% by weight of polyfluoroalkylethyl acrylate, (b-1) 5-65% by weight of 2-ethylhexyl methacrylate, and (b-2) 1-40% by weight of benzyl methacrylate to an emulsification treatment in the presence of (c) a polyethylene oxide adduct type, cationic surfactant, or both of the cationic surfactant and a polyethylene oxide adduct type, non-ionic surfactant, and (d) a glycol-based compound, followed by copolymerization reaction in the presence of a polymerization initiator, and admixing the resulting aqueous dispersion with (e) a blocked isocyanate.

2. The process for producing a water- and oil-repellent agent according to claim 1, wherein the blocked isocyanate is used in a proportion of 0.15-3.0 parts by weight on the basis of one part by weight of solid matters in the aqueous dispersion.

3. The process for producing a water- and oil-repellent agent according to claim 1, wherein the polyfluoroalkyl group-containing (meth)acrylate is used in a proportion of at least 10% by weight on the basis of the resulting copolymer at the time of preparing the aqueous dispersion.

4. The process for producing a water- and oil-repellent agent according to claim 1, wherein the polyfluoroalky group contained in the (meth)acrylate is mixed perfluoroalky groups containing perfluoroalky groups having 12 or more carbon atoms.

5. The process for producing a water- and oil-repellent agent according to claim 1, wherein a cross-linkable group-containing polymerizable monomer is further copolymerized at the time of preparing the aqueous dispersion.

6. The process for producing a water- and oil-repellent agent according to claim 1, wherein an organic acid-neutralized amine compound having a polyethylene oxide chain is used in place of the polyethylene oxide adduct type, cationic surfactant as component (c) at the time of preparing the aqueous dispersion.

7. The process for producing a water- and oil-repellent agent according to claim 1, wherein the glycol-based compound used as component (d) in the preparation of the aqueous dispersion is a polypropylene glycol-based compound or hexylene glycol.

8. A water- and oil-repellent agent produced by the process according to claim 1.

9. The water- and oil-repellent agent according to claim 8, which, when applied to synthetic or natural fibers, imparts water and oil repellency to the synthetic fibers and natural fibers.

10. A water- and oil-repellant agent produced by the process according to claim 5.

11. The water- and oil-repellent agent according to claim 10, which, when applied to synthetic or natural fibers, imparts water and oil repellency to the synthetic fibers and natural fibers.

* * * * *